Sept. 6, 1927.
A. G. SHAVER
1,641,461
SPEED CIRCUIT CONTROLLER
Original Filed Jan. 24, 1923    2 Sheets-Sheet 1
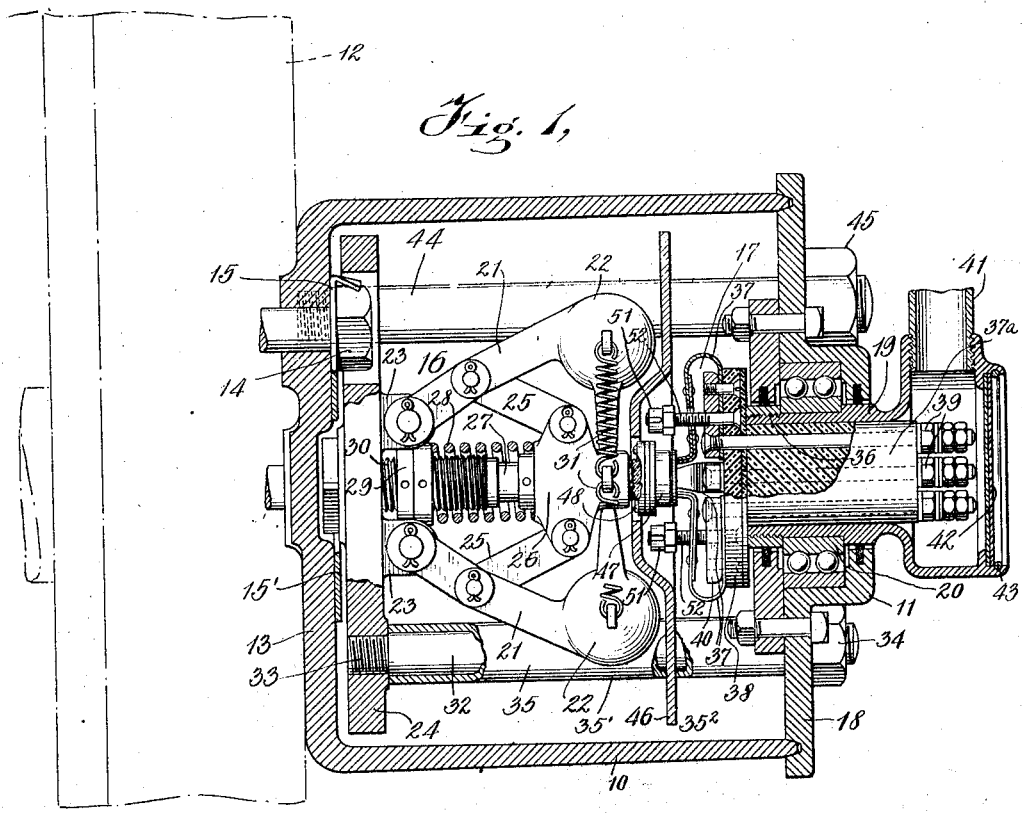
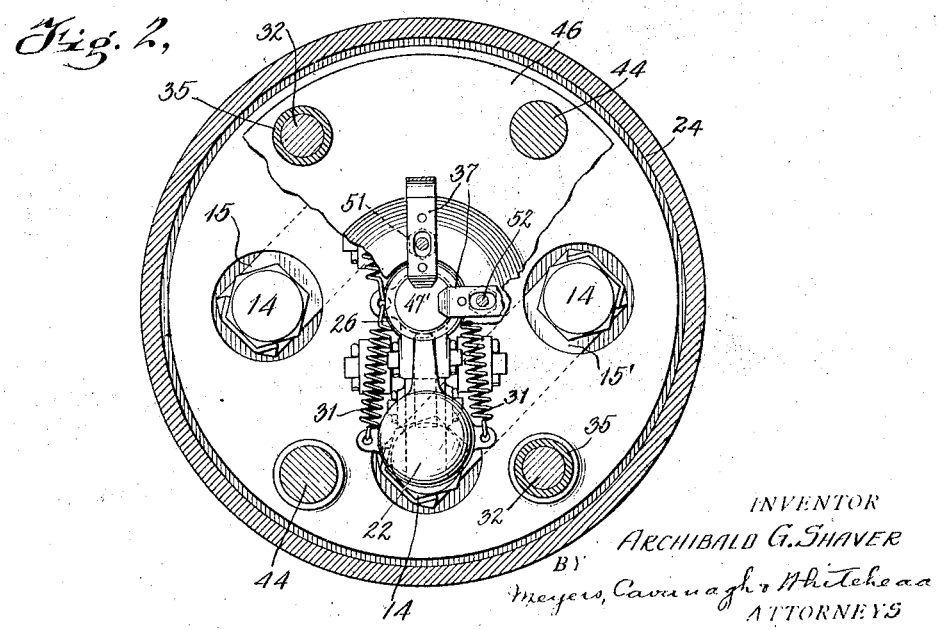
INVENTOR
ARCHIBALD G. SHAVER
BY
Meyers, Cavanagh & Whitehead
ATTORNEYS

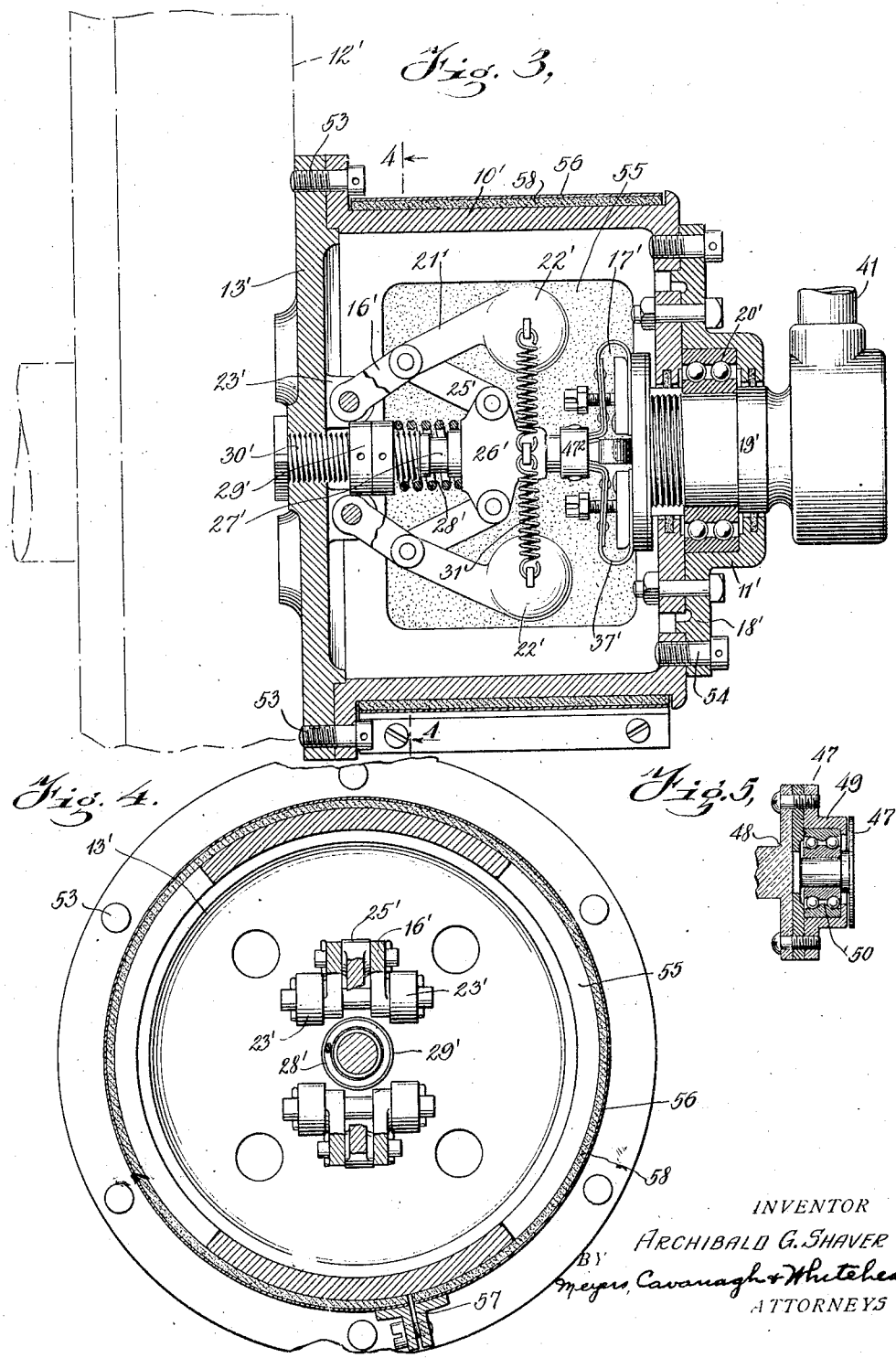

Patented Sept. 6, 1927.

1,641,461

UNITED STATES PATENT OFFICE.

ARCHIBALD G. SHAVER, OF CHICAGO, ILLINOIS, ASSIGNOR TO THE REGAN SAFETY DEVICES COMPANY, INC., OF NEW YORK, N. Y., A CORPORATION OF NEW YORK.

SPEED CIRCUIT CONTROLLER.

Application filed January 24, 1923, Serial No. 614,648. Renewed February 3, 1927.

This invention relates to speed control apparatus, and more particularly to improvements in the speed circuit controlling apparatus disclosed in my Patent 1,510,803, granted October 7, 1924, especially designed for use in the train control system disclosed in my Patent 1,505,062, granted August 12, 1924.

As disclosed in my copending applications, for controlling the speed of a vehicle or train there is provided a speed control apparatus which in the preferred form of construction comprises a centrifugal governor means actuated by the movement of the train and a mechanism such as a speed circuit controller means controlled by the action of the centrifugal governor, these parts being directly attached to a wheel of the vehicle, with the construction such that the centrifugal governor rotates bodily with the wheel and cooperates with the speed circuit controller which is held in a relatively stationary condition. Preferably there is provided a casing completely housing the governor and circuit controller means, part of said casing carrying the centrifugal governor being attached to the wheel, and another part carrying the relatively stationary speed circuit controller mounted for relative rotation on the first casing part. One of the prime desiderata of the present invention comprehends an improvement in this speed control apparatus whereby the speed circuit controller or the centrifugal governor with the speed circuit controller may be had access to in an easy manner for purposes of inspection, repair and replacement of parts, without the necessity of removal of the entire apparatus from the vehicle wheel; and whereby the speed circuit controller and the centrifugal governor may be removed from the casing housing the same without detaching the casing from the wheel.

The principal objects of my present invention may be said to include, besides the provision of a speed control apparatus in which the operating parts may be easily assembled and disassembled without removing the apparatus casing from its support such as the wheel of the vehicle; the further provision of an improved apparatus of this nature in which the speed circuit controller is guarded against any accidental derangement of the centrifuge means so that the constructional and operating integrity of the former is maintained in spite of the occurrence of a defect in the centrifuge means; the further provision of an improved speed control apparatus in which the speed circuit controller and the centrifugal governor are provided with cooperating contact means which may both be held relatively stationary during the rotation of the governor so as to minimize the wearing away of the contacts of the speed circuit controller; the still further provision of an apparatus of this nature in which the parts housed by the casing may be inspected without removal of any of the mechanism from the casing; and the provision of a speed control apparatus in which the parts are constructed to withstand the severe service conditions to which they are normally subjected in the movement of trains, with the parts relatively arranged to provide a compact and efficient unit.

To the accomplishment of the foregoing and such other objects as may hereinafter appear, my invention consists in the elements and their relation one to the other, as hereinafter particularly described and sought to be defined in the claims, reference being had to the accompanying drawings which show preferred embodiments of my invention, and in which:

Fig. 1 is a cross-sectional view of my speed control apparatus showing the same applied to the wheel of a vehicle, Fig. 2 is a cross-sectional elevational view of the same with parts broken away, Fig. 3 is a cross-sectional view of a modified form of my invention, Fig. 4 is a view taken in cross-section on the line 4—4, Fig. 3, and Fig. 5 is a cross-sectional view of a detail.

As heretofore mentioned, a principal object of the present invention includes the provision of a speed control apparatus in which the operating parts of the apparatus may be assembled and disassembled with facility and ease for purposes of inspecting, repairing and replacing the same without necessitating the removal of the entire apparatus from its support such as the wheel of the vehicle, and to this end there is provided as shown in Figs. 1 and 2 of the drawings a two-part casing including the casing body 10 and the casing cover 11, the casing body being directly attachable to a support such as the wheel 12 of a vehicle of the train so that the casing is carried by and rotates with the said wheel, the casing cover 11 being constructed to carry the operating mechanism either in whole or part so that the said mechanism which is normally housed by the casing 10 may be removed therefrom upon removal of the cover 11.

The casing 10 may be desirably attached to the wheel 12 by bolting the bottom 13 of the casing directly to the end of the axle of the wheel 12, which may be the wheel of the pony truck, by means of four spaced bolts 14 (see Fig. 2 of the drawings), these bolts being locked in position by strips of sheet iron 15 and 15', the said sheet iron strips each being provided with a plurality of apertures one at each end, the apertures receiving the bolts 14, the ends of the sheet iron strips being bent up against the heads of the spaced bolts as clearly shown in Figs. 1 and 2 of the drawings, this to prevent loosening of the said bolts.

The operating parts of the speed control apparatus comprise generally a speed actuated device such as the centrifugal governor means generally designated as 16 which rotates with the wheel 12 and the casing 10 and mechanism controlled by the action of the centrifugal governor, which in the present invention comprises the relatively stationary speed circuit controller generally designated as 17. In the embodiment shown in Figs. 1 and 2 of the drawings, the centrifugal governor 16 and the speed circuit controller 17 are attached to and carried by the cover 11 so that these parts may be removed from the casing upon removal of the cover. For supporting the relatively rotatable governor 16 and circuit controller 17, the cover 11 comprises generally two sections, a section 18 which is fixedly attached to the casing 10 and which carries the centrifugal governor 16, and a condulet section 19 mounted in the section 18 for free rotation therein as by means of the ball bearing device 20, the said condulet section carrying the circuit controlling means 17.

The centrifugal governor 16 may comprise the oppositely disposed centrifuge arms 21 carrying the centrifuge weights 22, the said arms being pivotally mounted in the apertured lugs 23 formed preferably integral with a rear plate 24, the said centrifuge arms being connected by means of the links 25 to a cross head 26 slidably movable on a rod 27 which is fixedly carried by the rear plate 24, a spring 28 anchored between the cross head 26 and an adjustable nut 29 being provided for acting in opposition to the centrifuge action, the adjustable nut 29 adjustable on the threaded portion 30 of the rod 27 being provided for adjusting the tension of the spring 28, the action of the spring 28 being supplemented, if desired, by auxiliary springs 31 connecting the centrifuge weights 22 with the cross head 26 as clearly shown in Fig. 1 of the drawings.

As heretofore mentioned, the centrifugal governor 16 is carried by the cover section 18, and to this end the rear plate 24 which supports the centrifuge mechanism is detachably mounted on the cover section 18 by means of a plurality of diametrically positioned rods 32 which are threadedly received by the rear plate 24 as shown at 33, Fig. 1, the said rods being received by suitable apertures in the cover section 18, the said rods being threaded at their front ends for receiving the nuts 34 (one of which appears in Fig. 1 of the drawings), the said rear plate 24 and cover section 18 being held in spaced position on these rods by means of the spacing sleeves 35 carried thereby.

The relatively stationary condulet section 19 may be formed of one piece as shown, and may be locked in position on the ball bearing means 20 by means of the retaining nut 36, the said condulet section being constructed to fixedly carry an insulating plug 37ª to which is attached the parts of the speed circuit controller, the said parts comprising a plurality of contact springs 37, four in number, arranged circumferentially on an insulating disk 38, the said contact springs being electrically connected to a plurality of binding posts 39 by means of the securing members 40, the said binding posts being longitudinally seated in the plug body 37ª. The condulet 19 is also constructed for receiving a conduit 41 for the leads or conductors to be connected to the binding posts 39, and for facilitating the attachment of the conductors the condulet is provided with a front closure 42 removably held in place by means of the removable locking ring 43.

For holding the cover 11 and its attached parts in position on the casing body 10, there are provided a plurality of diametrically positioned guide posts 44 fixed to the bottom 13 of the casing 10, the said guide posts being received by aligned apertures in the rear plate 24 and the cover section 18, the construction being such that the posts 44 guidingly receive the rear plate 24 and the cover section 18 and support the same in position in the casing when the cover is attached thereto, the cover being held in position by means of a plurality of nuts 45 (one of which is shown in Fig. 1) threadedly received by the front ends of the guide posts 44.

By means of this construction, it will be evident that the casing body 10 and the cover section 18 rotate with the rotation of the wheel 12 for actuating the centrifuge mechanism attached to and carried by the cover section 18, the circuit controlling means 17 being held relatively stationary by virtue of its attachment to the conduit 41, the cover section 18 rotating about the condulet section 19 carrying the circuit controlling parts. It will be further seen that by unscrewing the nuts 45, the cover 11 may be removed from the casing body, the removal of said cover effecting the withdrawal of the centrifuge and the circuit controlling means for purposes of inspection or repair, this being accomplished without removing the casing from its support. It will be further evident that the operating mechanism may also be separated by unscrewing the nuts 34, the centrifuge mechanism 16 being thereby disassociated from the speed circuit controlling means 17, a quick and convenient disassembly of the operating parts being thereby made possible.

For the purpose of maintaining the constructional and operating integrity of the circuit controlling means 17, and for preventing interference with the same resulting from any derangement of the centrifuge mechanism as when the same breaks loose and tumbles about inside the casing 10, I have provided a guard plate 46 interposed between the centrifuge mechanism 16 and the circuit controlling means 17, the said guard plate being held in position on the rods 32 by means of the spacing sleeves 35, and to this end the spacing sleeves 35 are made in sections 35' and 35², the said sections locking the guard plate 46 in position as clearly shown in Fig. 1 of the drawings. This construction has been found to work very advantageously for protecting the contact springs and associated parts from any defective behaviour of the centrifuge parts.

In the operation of the speed circuit controller, the action of the centrifuge mechanism controls the making and breaking of circuits connected to train mechanism for controlling the movement of trains, the construction and arrangement being such that the circuits are normally maintained closed when the speed of the vehicle is at or below a predetermined limit and are opened when the speed of the vehicle exceeds a predetermined limit. To accomplish this the centrifuge mechanism operates to normally bridge the contact springs 37 for closing the circuits, the centrifuge governor being provided with a contact button 47 carried by an insulating piece 48 which is attached to the cross head 26, the said button normally bridging the contact springs as shown and separating therefrom for opening the vehicle circuits when the centrifuge arms 21 fly out a predetermined distance. For the purpose of preventing the wearing away of the spring contacts 37, the contact button 47 of my present invention is mounted on the insulating piece 48 for free rotation thereon, and to this end the contact button may comprise a plate 47' (see Fig. 5) rotatably carried on the supporting member 49 by means of the ball bearing device 50. With this construction the contact plate 47' is held substantially stationary due to the pressure of the contact springs. In the actual operation, this plate rotates relatively slowly at the rate of about five revolutions per minute, which is just enough to keep the contacts clean, but is not enough to cause any wear on the same.

For the purpose of adjustably fixing the tension of the contact springs 37 and providing adjustable stop means therefor, there are provided the castellated nuts 51 adjustable on the threaded members 52 carried by the insulating disk 38.

Referring now to Figs. 3 and 4 of the drawings, wherein I show a modified form of my invention, the casing body may comprise two separable sections 10' and 13', the section 13' being attachable to a support such as the wheel 12' of the vehicle in a manner similar to that heretofore described, and the body section 10' being removably attachable to the bottom section 13' by means of the securing elements 53. The casing cover 11' in this form of my invention may also comprise the cover section 18' which is fixedly attached to the body 10' by means of the securing elements 54, and a relatively stationary condulet section 19' mounted in the section 18' for free rotation as by means of the ball bearing mechanism 20', this part of my construction being similar to that shown in Figs. 1 and 2 of the drawings.

In this modified construction the centrifuge mechanism 16' is carried by the bottom casing section 13' instead of being carried by and for removal with the casing cover, the centrifuge mechanism including the centrifuge arms 21' pivotally carried by the apertured lugs 23' formed preferably integrally with the bottom casing section 13', the said centrifuge arms carrying the centrifuge weights 22' with the arms connected to the cross head 26' by means of the links 25', the spring 28', the tension of which is adjustable by means of the adjustable nuts 29' movable on the thread portion 30' of the rod 27, which rod is fixedly carried by the bottom casing section 13', being provided in conjunction with the auxiliary springs 31' for counteracting the centrifuge action of the centrifuge mechanism. The centrifugal governor may also be provided with the contact button 47² which may be mounted for free rotation on the rod 27' if desired.

The speed circuit controller means 17' is carried by the casing cover for removal therewith, and more specifically is mounted as in the form already described on the condulet section 19'. With this construction, upon unscrewing the bolts 54 the cover 11' may be removed and the speed circuit controller means removed therewith, so that access may be had both to such speed circuit controller means and to the centrifuge mechanism within the casing.

For the purpose of permitting a quick inspection of the apparatus without removing any of the parts thereof, I may provide the casing body 10' with one or more inspection windows 55, the said windows being normally closed by means of a sheet metal closure or cover 56 locked in position by means of the clamp 57, the said sheet metal cover fitting over a gasket 58. Although this inspection window and removable closure therefor is shown provided for the modified form of my invention, it will be understood that such means may similarly be employed with the construction shown in Figs. 1 and 2 of the drawings.

The use and operation of my improved speed control apparatus will in the main be fully apparent from the above detailed description thereof. It will be further apparent that by means of the improved construction provided a quick and easy assembly and disassembly of the operating parts of the mechanism may be effected without dismantling the apparatus as a whole or removing the same from the pony truck wheel, a part and in the preferred construction the whole of the operating mechanism being removable with the cover of the casing. By means of the other improvements provided, the speed circuit controller mechanism is guarded against any accidental derangement or other defective behavior of the centrifuge means, the integrity of the former being thereby maintained and the cooperating centrifuge and speed circuit controlling parts are so constructed as to withstand the severe service conditions to which these parts are normally subjected in train control operations.

While I have shown my invention in the preferred forms, it will be obvious that many changes and modifications may be made in the structure disclosed without departing from the spirit of the invention, defined in the following claims.

I claim:

1. In combination with a wheel and axle of a vehicle, a speed control apparatus comprising a casing having a part connected to the wheel and axle and carried thereby, a cover for the casing removable therefrom without detaching the casing from the wheel and axle, and speed control mechanism housed by the casing including means carried by the cover and removable therewith.

2. In combination with a wheel and axle of a vehicle, speed control apparatus comprising a multiple part casing, one part being directly attached to the wheel and axle of the vehicle and another part being removable from the first part without detaching the latter from the wheel and axle, and speed control mechanism housed by the casing including means carried by the said second casing part and removable therewith.

3. A speed control apparatus comprising a multiple part casing, one part being attachable to a support and another part being removable from the first part without detaching the latter from the support, and speed control mechanism housed by the casing including a circuit controlling means carried by the said second casing part and removable therewith.

4. A speed control apparatus comprising a multiple part casing, one part being directly attachable to a wheel of a vehicle and another part being removable from the first part without detaching the latter from the wheel, and speed control mechanism housed by the casing including a circuit controlling means carried by the said second casing part and removable therewith.

5. A speed control apparatus comprising a casing attachable to a vehicle, a cover therefor removable therefrom without detaching the casing from the vehicle, and speed control mechanism housed by the casing including a circuit controlling means carried by the cover and removable therewith.

6. A speed control apparatus comprising a casing, a removable cover therefor, said cover including a part fixedly attached to the casing and a part rotatable relatively thereto, and speed control mechanism housed by the casing including means carried by the second mentioned cover part and removable with the cover.

7. A speed control apparatus comprising a casing constructed for direct attachment to a wheel of a vehicle, a cover therefor removable therefrom without detaching the casing from the wheel, said cover including a part fixedly attached to the casing and a part rotatable relatively thereto, and speed control mechanism housed by the casing including means carried by the second mentioned cover part and removable with the cover.

8. A speed control apparatus comprising a multiple part casing, one part being attached to a support and another part being removable from the first part without detaching the latter from the support, the said second casing part including a section fixedly attached to the first casing part and a section rotatable relatively thereto, and speed control mechanism housed by the casing including means carried by the said second mentioned section and removable with the second casing part.

9. A speed control apparatus comprising a casing, a removable cover therefor, said cover including a part fixedly attached to the casing and a part rotatable relatively thereto, and speed control mechanism housed by the casing including a circuit controlling means carried by the second mentioned cover part and removable with the cover.

10. A speed control apparatus comprising a two-part casing, one part being attachable to a support and the other part being removable from the first part without detaching the latter from the support, and speed control mechanism including a speed responsive means and a circuit controlling means operated thereby, housed by the casing and carried by the said second casing part for removal therewith.

11. A speed control apparatus comprising a multiple part casing, one part being attachable to a support and another part being removable from the first part without detaching the latter from the support, and speed control mechanism including a centrifugal governor means and a circuit controlling means operated thereby housed by the casing and carried by the said second casing part for removal therewith.

12. A speed control apparatus comprising a two-part casing, one part being attachable to a support and the other part being removable from the first part without detaching the latter from the support, and speed control mechanism including a centrifugal governor means and a circuit controlling means housed by the casing and carried by the said second casing part for removal therewith.

13. A speed control apparatus comprising a two-part casing, one part being removable from the other, and speed control mechanism including centrifugal governer means and a circuit controlling means housed by the casing and carried by said second casing part for removal therewith.

14. A speed control apparatus comprising a casing, a removable cover therefor, and speed control mechanism including a centrifugal governor means and a circuit controlling means housed by the casing and carried by the cover for removal therewith.

15. A speed control apparatus comprising a casing, a removable cover therefor, the said cover including a section fixedly attached to the casing and a section rotatable relatively thereto, and speed control mechanism including a centrifugal governor means housed by the casing and carried by the said first mentioned cover section for removal therewith.

16. A speed control apparatus comprising a casing constructed for direct attachment to a wheel of a vehicle, a removable cover therefor, the said cover including a section fixedly attached to the casing and a section rotatable relatively thereto, and speed control mechanism housed by the casing, the said speed control mechanism including a centrifugal governor carried by the first mentioned cover section and a circuit controller carried by the second mentioned cover section for removal with the cover.

17. A speed control apparatus comprising a centrifugal speed governor, mechanism cooperating therewith and controlled thereby, and guard means interposed between the centrifugal speed governor and the said mechanism for preventing improper activity of the latter due to any derangement of the former.

18. A speed control apparatus comprising a centrifugal speed governor, speed circuit controller mechanism cooperating therewith and controlled thereby, and guard means interposed between the centrifugal speed governor and the said speed circuit controller mechanism for preventing improper activity of the latter due to any derangement of the former.

19. A speed control apparatus comprising a speed actuated means, mechanism cooperating therewith and controlled thereby, and a guard plate interposed between the speed actuated means and the said mechanism for preventing improper activity of the latter due to any derangement of the former.

20. A speed control apparatus comprising a casing and a cover therefor, a centrifugal speed governor housed by the casing for rotation therewith, a speed circuit controller mechanism carried by the cover and adapted to be held stationary relative to the rotatable casing, means whereby the centrifugal speed governor controls the activity of the speed circuit controller, and guard means interposed between the governor and the controller for preventing improper activity of the latter due to any derangement of the former.

21. A speed control apparatus comprising a speed actuated means, mechanism cooperating therewith and controlled thereby, the said means and mechanism being relatively rotatable, and provisions carried by the former adapted to engage and disengage the latter in the operation of the apparatus, the said provisions being mounted on the former for rotation thereon and for rotation relatively thereto.

22. A speed control apparatus comprising a relatively rotatable speed actuated means, relatively stationary mechanism cooperating therewith, and provisions carried by the former for engaging and disengaging the latter during rotation of the former, the said provisions being mounted on the former for rotation thereon and for rotation relatively thereto.

23. A speed control apparatus comprising a rotatable centrifugal governor, a stationary speed circuit controller cooperating therewith, and provisions carried by the governor for engaging and disengaging the circuit controller during rotation of the governor, the said provisions being mounted on the governor for rotation thereon and for rotation relatively thereto.

24. A speed control apparatus comprising a rotatable centrifugal governor, a stationary speed circuit controller cooperating therewith, and provisions including a contact member carried by the governor for engaging and disengaging the circuit controller during rotation of the governor, the said contact member being freely rotatable on the governor.

25. A speed control apparatus comprising a casing constructed for attachment to a wheel of a vehicle, the said casing including end plates and a side wall, an inspection window in said side wall, and a cover for said side wall normally closing the window and removable for opening the said window.

26. A speed control apparatus comprising a speed actuated means, movable spring contact mechanism engageable and disengageable thereby, and adjustable stop means for limiting the movement of the spring contact mechanism in one direction and for determining the point at which the speed actuated means disengages the same.

27. A speed control apparatus comprising a centrifugal speed governor, a speed circuit controller including movable spring contact means engageable and disengageable by the speed governor, and adjustable stop means for limiting the movement of the spring contact means in one direction and for determining the point at which the speed governor disengages the same.

Signed at Chicago, in the County of Cook and State of Illinois, this 17th day of January A. D. 1923.

ARCHIBALD G. SHAVER.